(12) United States Patent
Dowski, Jr. et al.

(10) Patent No.: US 6,911,638 B2
(45) Date of Patent: Jun. 28, 2005

(54) WAVEFRONT CODING ZOOM LENS IMAGING SYSTEMS

(75) Inventors: Edward Raymond Dowski, Jr., Lafayette, CO (US); Inga Prischepa, Boulder, CO (US)

(73) Assignee: The Regents of the University of Colorado, a body corporate, Boulder, CO (US)

( * ) Notice: Subject to any disclaimer, the term of this patent is extended or adjusted under 35 U.S.C. 154(b) by 83 days.

(21) Appl. No.: 10/364,552

(22) Filed: Feb. 11, 2003

(65) Prior Publication Data

US 2003/0127584 A1 Jul. 10, 2003

Related U.S. Application Data

(63) Continuation-in-part of application No. 09/910,675, filed on Jul. 20, 2001, now abandoned, and a continuation-in-part of application No. 09/070,969, filed on May 1, 1998, now abandoned, which is a continuation-in-part of application No. 08/823,894, filed on Mar. 17, 1997, now Pat. No. 5,748,371, which is a continuation of application No. 08/384,257, filed on Feb. 3, 1995, now abandoned.

(51) Int. Cl.[7] .................................................. G01J 1/20
(52) U.S. Cl. .................... 250/201.9; 250/216; 359/558
(58) Field of Search ............................. 250/201.9, 216; 348/335, 345; 396/72–76; 359/676–693

(56) References Cited

U.S. PATENT DOCUMENTS

| 2,959,105 A | 11/1960 | Sayanagi |
| 3,054,898 A | 9/1962 | Westover et al. |
| 3,305,294 A | 2/1967 | Alvarez |
| 3,583,790 A | 6/1971 | Baker |
| 3,614,310 A | 10/1971 | Korpel |
| 3,856,400 A | 12/1974 | Hartmann et al. |
| 3,873,958 A | 3/1975 | Whitehouse |
| 4,062,619 A | 12/1977 | Hoffman |

(Continued)

FOREIGN PATENT DOCUMENTS

| EP | 0531926 B1 | 3/1993 |
| EP | 0584769 B1 | 3/1994 |
| EP | 0618473 A2 | 10/1994 |
| EP | 0759573 A2 | 2/1997 |
| EP | 0791846 A2 | 8/1997 |
| EP | 0981245 A2 | 2/2000 |
| GB | 2278750 A | 12/1994 |
| JP | 2000-98301 A | 4/2000 |
| WO | WO 99/57599 | 11/1999 |

OTHER PUBLICATIONS

Hecht, Eugene, *Optics*, Second Edition, 1987, pp. 177–181.
Veldkamp, Wilfrid B., and McHugh, Thomas J., "Binary Optics", Scientific American, May 1 1992, vol. 266, No. 5, pp. 50–55.
O'Shea, Donald C. and Harrigan, Michael E., "Chapter 33, Aberration Curves in Lens Design", Handbook of Optics, vol. 1, 1995, pp. 33.1–33.5, McGraw–Hill, New York.
Abstract of JP 60247611 A, published Jul. 12, 1985 (Toshiba KK), Patent Abstracts of Japan, May 6, 1986, vol. 010, No. 119 (p–435), 1 page.

(Continued)

*Primary Examiner*—Stephone B. Allen
*Assistant Examiner*—Patrick J. Lee
(74) *Attorney, Agent, or Firm*—Lathrop & Gage, L.C.

(57) ABSTRACT

A wide-angle zoom lens with as few as two plastic elements codes the wavefront produced by the imaging system such that the imaging system is substantially invariant to aberrations related to misfocus. Signal processing is used to decode the wavefront to form the final image. A first type of zoom lens configuration uses as few as two lens elements. In this type, image processing may be modified to take into account the positioning of the lenses.

29 Claims, 10 Drawing Sheets

U.S. PATENT DOCUMENTS

| | | |
|---|---|---|
| 4,082,431 A | 4/1978 | Ward, III |
| 4,174,885 A | 11/1979 | Joseph et al. |
| 4,178,090 A | 12/1979 | Marks et al. |
| 4,255,014 A | 3/1981 | Ellis |
| 4,275,454 A | 6/1981 | Klooster, Jr. |
| 4,276,620 A | 6/1981 | Kahn et al. |
| 4,308,521 A | 12/1981 | Casasent et al. |
| 4,349,277 A | 9/1982 | Mundy et al. |
| 4,466,067 A | 8/1984 | Fontana |
| 4,480,896 A | 11/1984 | Kubo et al. |
| 4,573,191 A | 2/1986 | Kidode et al. |
| 4,575,193 A | 3/1986 | Greivenkamp, Jr. |
| 4,580,882 A | 4/1986 | Nuchman et al. |
| 4,589,770 A | 5/1986 | Jones et al. |
| 4,642,112 A | 2/1987 | Freeman |
| 4,650,292 A | 3/1987 | Baker et al. |
| 4,725,881 A | 2/1988 | Buchwald |
| 4,734,702 A | 3/1988 | Kaplan |
| 4,794,550 A | 12/1988 | Greivenkamp, Jr. |
| 4,804,249 A | 2/1989 | Reynolds et al. |
| 4,825,263 A | 4/1989 | Desjardins et al. |
| 4,827,125 A | 5/1989 | Goldstein |
| 4,843,631 A | 6/1989 | Steinpichler et al. |
| 4,936,661 A | 6/1990 | Betensky et al. |
| 4,964,707 A | 10/1990 | Hayashi |
| 4,989,959 A | 2/1991 | Plummer |
| 5,003,166 A | 3/1991 | Girod |
| 5,076,687 A | 12/1991 | Adelson |
| 5,102,223 A | 4/1992 | Uesugi et al. |
| 5,128,874 A | 7/1992 | Bhanu et al. |
| 5,142,413 A | 8/1992 | Kelly |
| 5,165,063 A | 11/1992 | Strater et al. |
| 5,166,818 A | 11/1992 | Chase et al. |
| 5,193,124 A | 3/1993 | Subbarao |
| 5,218,471 A | 6/1993 | Swanson et al. |
| 5,243,351 A | 9/1993 | Rafanelli et al. |
| 5,248,876 A | 9/1993 | Kerstens et al. |
| 5,270,825 A | 12/1993 | Takasugi et al. |
| 5,270,861 A | 12/1993 | Estelle |
| 5,270,867 A | 12/1993 | Estelle |
| 5,280,388 A | 1/1994 | Okayama et al. |
| 5,299,275 A | 3/1994 | Jackson et al. |
| 5,301,241 A | 4/1994 | Kirk |
| 5,307,175 A | 4/1994 | Seachman |
| 5,317,394 A | 5/1994 | Hale et al. |
| 5,337,181 A | 8/1994 | Kelly |
| 5,426,521 A | 6/1995 | Chen et al. |
| 5,438,366 A | 8/1995 | Jackson et al. |
| 5,442,394 A | 8/1995 | Lee |
| 5,444,574 A | 8/1995 | Ono et al. |
| 5,465,147 A | 11/1995 | Swanson |
| 5,473,473 A | 12/1995 | Estelle et al. |
| 5,476,515 A | 12/1995 | Kelman et al. |
| 5,521,695 A | 5/1996 | Cathey, Jr. et al. |
| 5,532,742 A | 7/1996 | Kusaka et al. |
| 5,555,129 A | 9/1996 | Konno et al. |
| 5,565,668 A | 10/1996 | Reddersen et al. |
| 5,568,197 A | 10/1996 | Hamano |
| 5,572,359 A | 11/1996 | Otaki et al. |
| 5,610,684 A | 3/1997 | Shiraishi |
| 5,640,206 A | 6/1997 | Kinoshita et al. |
| 5,706,139 A | 1/1998 | Kelly |
| 5,748,371 A * | 5/1998 | Cathey et al. .............. 359/558 |
| 5,751,475 A | 5/1998 | Ishiwata et al. |
| 5,756,981 A | 5/1998 | Roustaei et al. |
| 5,969,853 A | 10/1999 | Takaoka |
| 5,969,855 A | 10/1999 | Ishiwata et al. |
| 6,021,005 A | 2/2000 | Cathey, Jr. et al. |
| 6,025,873 A | 2/2000 | Nishioka et al. |
| 6,034,814 A | 3/2000 | Otaki |
| 6,037,579 A | 3/2000 | Chan et al. |
| 6,069,738 A | 5/2000 | Cathey, Jr. et al. |
| 6,091,548 A | 7/2000 | Chen |
| 6,097,856 A * | 8/2000 | Hammond, Jr. .............. 382/312 |
| 6,121,603 A | 9/2000 | Hang et al. |
| 6,128,127 A | 10/2000 | Kusaka |
| 6,144,493 A * | 11/2000 | Okuyama et al. ........... 359/566 |
| 6,172,723 B1 | 1/2001 | Inoue et al. |
| 6,172,799 B1 | 1/2001 | Raj |
| 6,208,451 B1 | 3/2001 | Itoh |
| 6,218,679 B1 | 4/2001 | Takahara et al. |
| 6,219,113 B1 | 4/2001 | Takahara |
| 6,248,988 B1 | 6/2001 | Krantz |
| 6,285,345 B1 | 9/2001 | Crossland et al. |
| 6,288,382 B1 | 9/2001 | Ishihara |
| 6,337,472 B1 | 1/2002 | Garner et al. |

OTHER PUBLICATIONS

Poon, Ting–Chung and Motamedi, Masoud, "Optical/digital incoherent image processing for extended depth of field", Applied Optics vol. 26, No. 21, No. 1, 1987, pp. 4812–4815.

Bradburn, Sarah, Cathey, Wade Thomas and Dowski, Edward R. Jr., "Realizations of focus invariance in optical–digital systems with wave–front coding", *Applied Optics* vol. 36, No. 35, Dec. 10, 1997, pp. 9157–9166.

Van Der Gracht, Joseph, Dowski, Edward R., Jr., Cathey, W. Thomas and Bowen, John P., "Aspharic optical elements for extended depth of field imaging", SPIE vol. 2537, pp. 279–288.

J. Ojeda–Castaneda, L. R. Berriel–Valdos, and E. Montes, "Spatial filter for increasing the depth of focus", Optics Letters, vol. 10, No. 11, p520–522, Nov., 1985.

J. Ojeda–Castaneda, and A. Diaz, "High focal depth by quasibifocus", vol. 27, No. 20, p4163–4165, Oct. 15, 1988.

W. Chi and N. George, "Electronic imaging using a logarithmic asphere", Optics Letters, vol. 26, No., 12. p 875–877, Jun. 15, 2001.

J. Ojeda–Castaneda, E. Tepichin, and A. Pons, "Apodization of annular apertures: Strehl ratio", Applied Optics, vol. 27, No. 24, p 5140–5145, Dec. 15, 1988.

D. L. Marks, R. A. Stack, D. J. Brady, and J. Van Der Gracht, "Three–dimensional tomograpy using a cubic–phase plate extended depth–of–field system", Optics Letters, vol. 24, No. 4, p 253–255, Feb. 15, 1999.

S. C. Tucker, W. T. Cathey, and E. R. Dowski, Jr, "Extended depth of field and aberration control for inexpensive digital microscope systems", Optics Express. vol. 4, No. 11, p467–474, May 24, 1999.

H. Bartelt, J. Ojeda–Castaneda, and E. E. Sicre, "Misfocus tolerance seen by simple inspection of the ambiguity function", Applied Optics, vol. 23, No. 16, p 2693–2695, Aug. 15, 1984.

J. Ojeda–Castaneda, L. R. Berriel–Valdos, and E. Montes, "Ambiuguity function as a design tool for high focal depth", Applied Optics, vol. 27, No. 4, p 790–795, Feb. 15, 1988.

J. Ojeda–Castaneda, P. Andres, and A. Diaz, "Annular apodizers for low sensitivity to defocus and to spherical aberration", Optics Letters, vol. 11, No. 8, p 487–489, Aug., 1988.

J. Ojeda–Castaneda, E. Tepichin, and A. Diaz, "Arbitrarily high focal depth with a quasioptimum real and positive transmittance apodizer", Applied Optics, vol. 28, No. 13, p 2666–2670, Jul. 1, 1989.

J. Ojeda–Castaneda, and L. R. Berriel–Valdos, "Arbitrarily high focal depth with finite aperatures", Optics Letters, vol. 13, No. 3, p 183–185, Mar. 1988.

G. Indebetouw, and H. Bai, "Imaging with Fresnel zone pupil masks: Extended depth of field", Applied Optics, vol. 23, No. 23, p. 4299–4302, Dec. 1, 1984.

W. T. Welford, "Use of annular apertures to increase focal depth", Journal of the Optical Society of America, vol. 50, No. 8, p 749–753, Aug., 1960.

C. Varamit, and G. Indebetouw, "Imaging properties of defocused partioned pupils", J. Opt. Soc. Am. A, vol. 2, No. 6, p 799–802, Jun. 1985.

E. R. Dowski Jr., and W. T. Cathey, "Single lens single-image incoherent passive-ranging systems", Applied Optics, vol. 33, No. 29, p 8782–8773, Oct. 10, 1994.

W. T. Cathey, B. R. Frieden, W. T. Rhodes, and C. K. Rushforth, "Image gathering and processing for enhanced resolution", J. Opt. Soc. Am. A, vol. 1, No. 3, p 241–250, Mar. 1984.

J. Van Der Gracht, E. R. Dowski Jr., M. G. Taylor, and D. M. Deaver, "Broadband behavior of an optical-digital focus-invariant system", Optics Letters, vol. 21, No. 13, p 919–921, Jul. 1, 1996.

G. Hausler, "A method to increase the depth of focus by two step image processing", Optical Communications, vol. 6, No. 1, p 38–42, Sep., 1972.

C. J Cogswell, N. I. Smith, K. G. Larkin, and P. Hariharan, "Quantitative DIC microscopy using a geometric phase shifter", SPIE, vol. 2984, p72–81, 1997.

H. Wang, and F. Gan, "High focal depth with a pure-phase apodizer", Applied Optics, vol. 40, No. 31, p 5658–5682, Nov. 1, 2001.

H. Wang, and F. Gan, "Phase-shifting apodizers for increasing focal depth", Applied Optics, vol. 41, No. 25, p 5263–5266, Sep. 1, 2002.

S. S. Sherif, E. R. Dowski, Jr and W. T. Cathey, "A logarithmic phase filter to extend the depth of field of incoerent hybrid imaging systems", Applied Optics, in press.

D. Kermisch, "Partially coherent image processing by laser scanning", Journal of the Optical Society of America, vol. 65, No. 8, p 887–891, Aug., 1975.

R. J. Pieper and A. Korpel, "Image processing for extended depth of field", *Applied Optics,* vol. 22, No. 10, p 1449–1453, May 15, 1983.

G. E. Johnson, E. R. Dowski, Jr. and W. T. Cathey, "Passive ranging through wave-front coding: information and application", Applied Optics, vol. 39, No. 11, p 1700–1710, Apr. 10, 2000.

G. Y. Sirat, "Conoscopic holography. I. Basic principles and physical basis", J. Opt. Soc. Am. A, vol. 9, No. 1, p 70–90, Jan. 1992.

E. R. Dowski, Jr. and W. T. Cathey, "Extended depth of field through wave-front coding", Applied Optics, vol. 34, No. 11, p 1859–1866, Apr. 10, 1995.

H. B. Wach, E. R. Dowski,Jr., and W. T. Cathey, "Control of chromatic focal shift through wave-front coding", Applied Optics, vol. 37, No. 23, p 5359–5367, Aug. 19, 1998.

D. Kermisch, "Principle of equivalence between scanning and conventional optical imaging systems",*J. Opt. Soc. Am,* vol. 67, No. 10, p 1357–1360, Oct., 1977.

J. Ojeda–Castaneda., R. Ramos and A. Noyola–Isgleas, "High focal depth by apodization and digital restoration", Applied Optics, vol. 27, No. 12, p 2583–2588, Jun. 15, 1988.

J. Ojeda–Castaneda., and L. R. Berriel–Valdos, "Zone plate for arbitrarily high focal depth", Applied Optics, vol. 29, No. 7, p 994–997, Mar. 1, 1990.

J.T. McCrickerd, "Coherent processing and depth of focus of annular aperture imagery", Applied Optics, vol. 10, No. 10, p2226–2230, Oct., 1971.

M.Mino and Y. Okano, "Improvement in the OTF of a defocused optical system through the use of shade apertures", Applied Optics, vol. 10, No. 10,p2219–2225, Oct., 1971.

S. Kubo, M. Inui, and Y. Miyake, "Preferred sharpness of photographic color images", Journal of Imaging Science, vol. 29,No. 6, p213–215, Nov./Dec. 1985.

C. J. Cogswell and C. J. R. Sheppard, "Confocal differential interference contrast (DIC) microscopy: including a theoretical analysis of conventional and confocal DIC imaging", Journal of Microscopy, vol. 165, part 1, p 81–101, Jan., 1992.

J. M. Schmitt, S. L. Lee and K. M. Yung, "An optical coherence microscope with enhanced resolving power in thick tissue", Optics Communications, vol. 142, p 203–207, Oct. 15, 1997.

K. J. Barnard, E. A. Watson and P. F. McManamon, "Non-mechanical microscanning using optical space–fed phased arrays", Optical Engineering, vol. 33, No. 9, p 3063–3071, Sep., 1994.

W. T. Cathey and W. C. Davis, "Imaging system with range to each pixel", J Opt. Soc. Am A, vol. 3, No. 9, p1537–1542, Sep., 1988.

J. E. Greivenkamp, "Color dependent optical prefilter for the suppression of aliasing artifacts", Applied Optics, vol. 29, No. 5, p 676–684, Feb. 10, 1990.

J T. McCrickerd, "Coherent processing and depth of focus of annular aperture imagery", Applied Optics, vol. 10, No. 10, p 2226–2230, Oct., 1971.

M. Kawakita, K. Iizuka, T. Aida, H. Kikuchi, H. Fujikake, J. Yonai and K. Takizawa, "Axi–version camera; a three–dimension camera", in Three–dimensional Image Capture and Applications III, Brian D. Corner, Joseph H. Nurre, Editors, Proceedings of SPIE, vol. 3958, p 61–70, 2000.

C. Wust and D. W. Capson, "Surface profile measurement using color fringe projection", Machine Vision and Applications, vol. 4, p 193–203, 1991.

S. V. Shatalin, J. B. Tan, R. Juskaitis and T. Wilson, "Polarization contrast imaging of thin films in scanning microscopy", Optics Communications, vol. 116, p. 291–299, May 1, 1995.

T. Fukano, "Geometrical cross–sectional imaging by a heterodyne wavelength–scanning interference confocal microscope", Optics Letters, vol. 25, No. 8, p 548–550, Apr. 15, 2000.

Q–S. Chen and M. S. Weinhous, "Sub–pixel shift with fourier transformation to achieve efficient and high quality image interpolation", SPIE, vol. 2, No. 3661, p 728–736, Feb. 1999.

H. Wei, and T. D. Binnie, "High–resolution image reconstruction for multiple low–resolution images", 7th International Conference on Image Processing and its Applications Pub. # 485, vol. 2 p596–600 (1999).

G. Hausler, and E. Korner, "Imaging with expanded depth of focus", Zeiss Inform, Oberkochen, 29, No. 98E, p 91–3 (1986/1987).

* cited by examiner

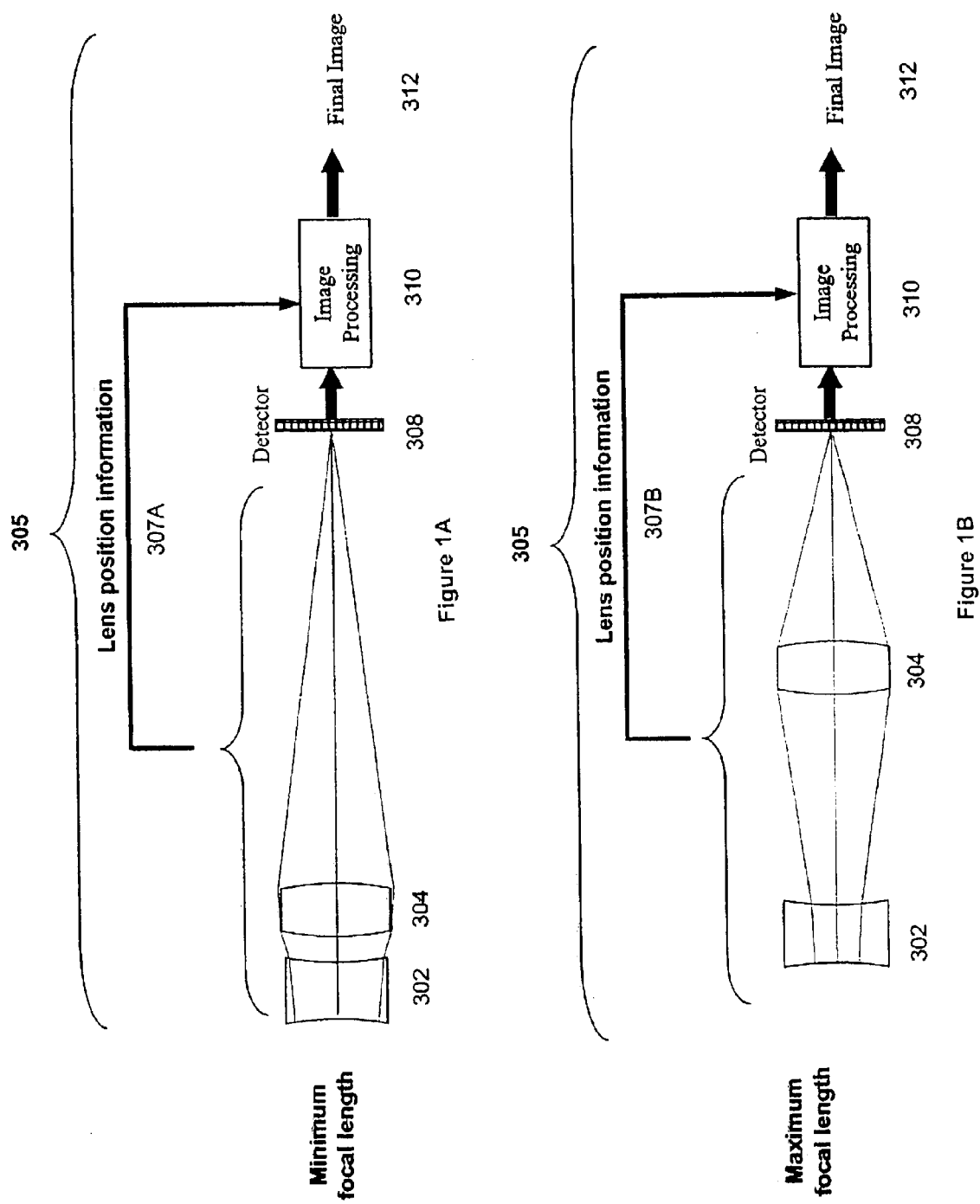

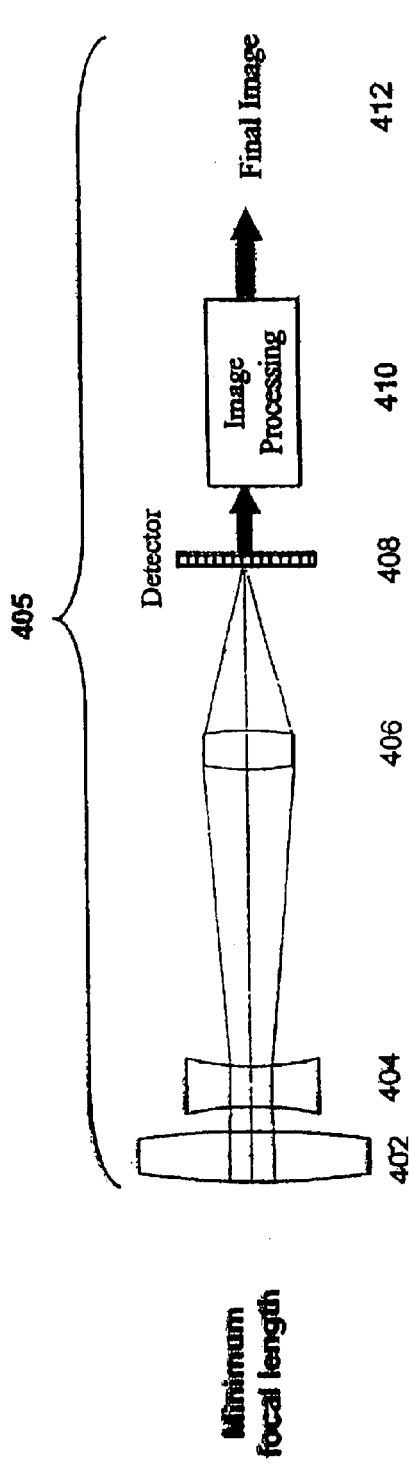
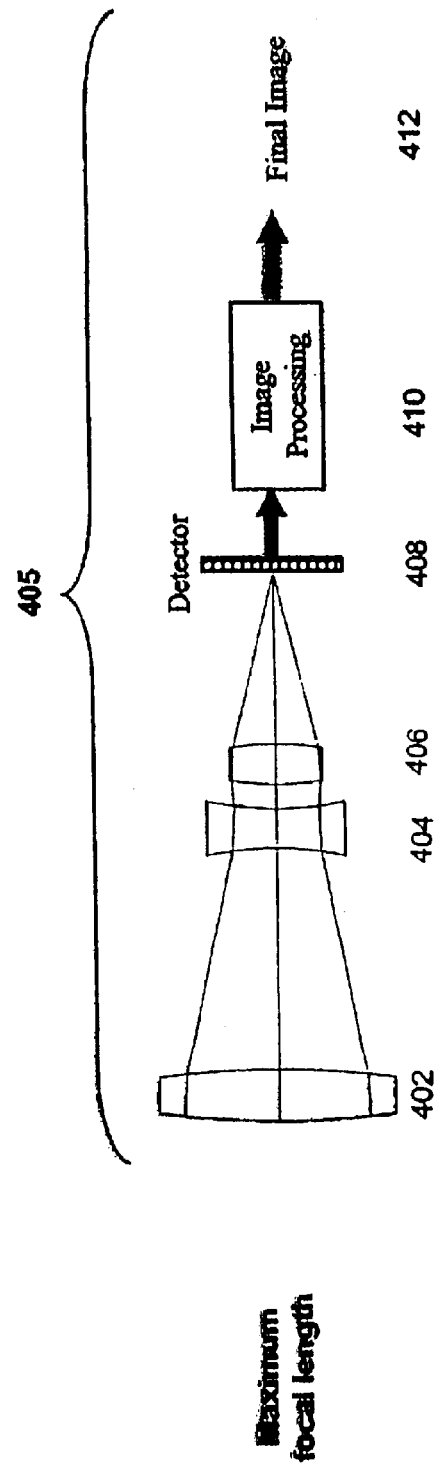

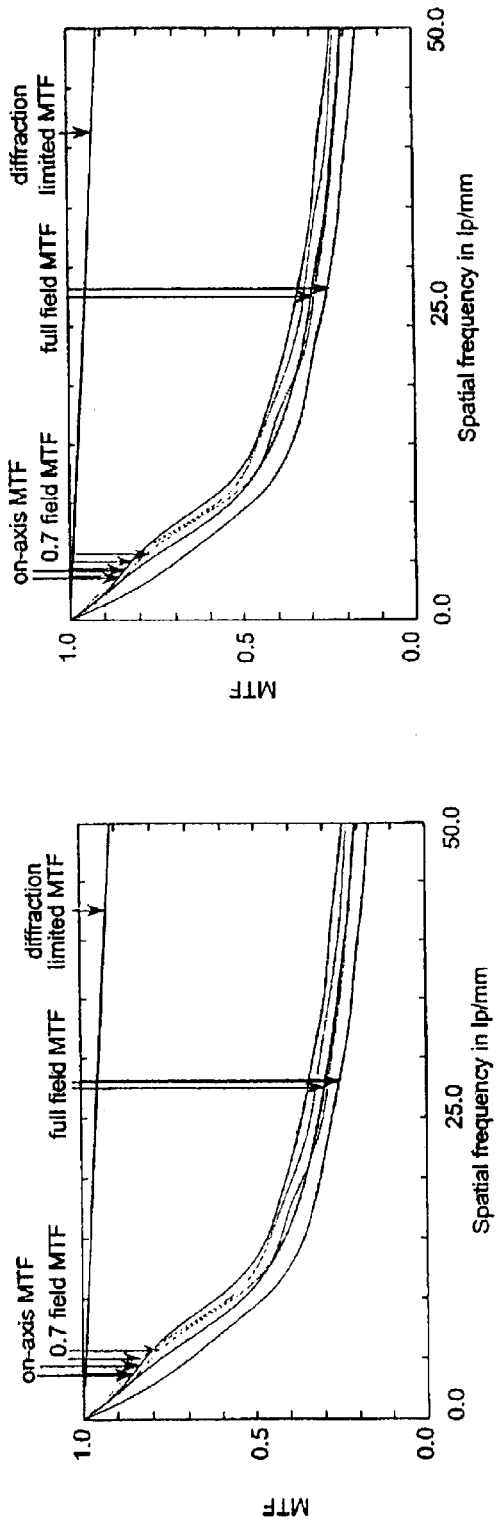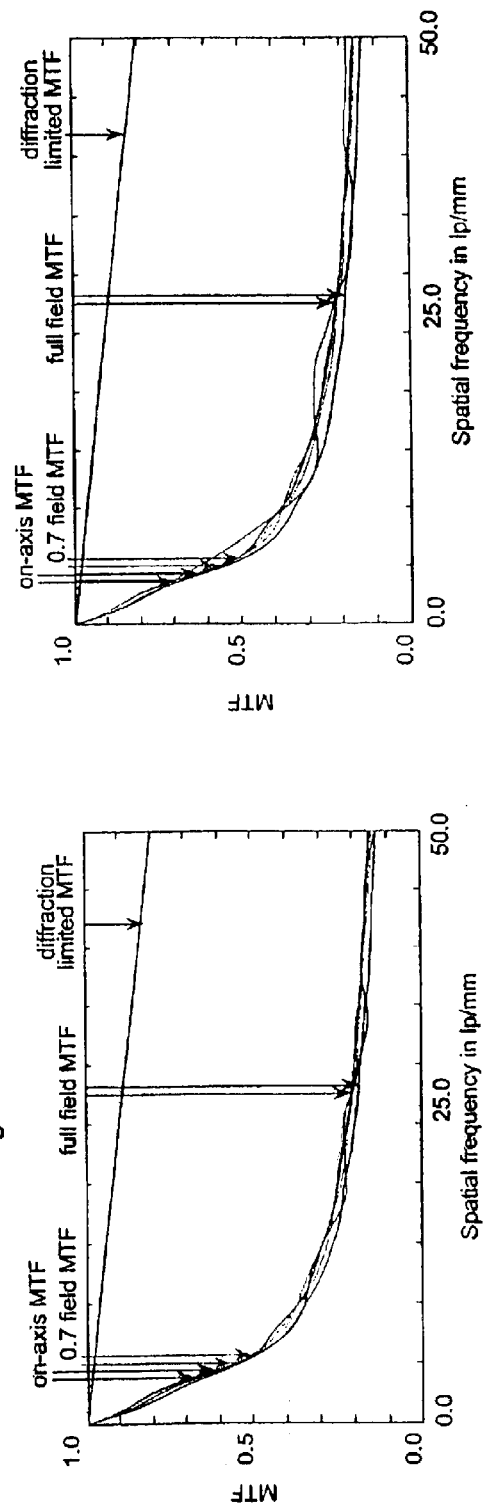
Figure 7A
Figure 7B
Figure 7C
Figure 7D

WAVEFRONT CODING ZOOM LENS IMAGING SYSTEMS

CROSS-REFERENCE TO RELATED APPLICATIONS

This patent application is a continuation-in-part of commonly-owned and U.S. patent application Ser. No. 09/910,675, now abandoned, filed on Jul. 20, 2001 and incorporated herein by reference. This patent application is also a continuation-in-part of commonly-owned and U.S. patent application Ser. No. 09/070,969, filed on May 1, 1998 now abandoned and incorporated herein by reference. U.S. patent application Ser. No. 09/070,969 is a continuation-in-part of U.S. patent application Ser. No. 08/823,894, filed Mar. 17, 1997, now U.S. Pat. No. 5,748,371, issued May 5, 1998 and incorporated herein by reference. U.S. patent application Ser. No. 08/823,894 is a continuation of U.S. patent application Ser. No. 08/384,257, filed Feb. 3. 1995, now abandoned. U.S. application Ser. No. 09/875,435, filed Jun. 6, 2001, now U.S. Pat. No. 6,525,302, and pending U.S. application Ser. No. 09/875,766, filed June 6, 2001, and Ser. No. 09/766,325, filed Jan. 19, 2001, are each incorporated herein by reference.

BACKGROUND

Zoom lens designs are based on the property that the power of an optical system consisting of at least two lens groups can be varied by changing the distance between the groups. The lens capabilities depend on the number of moving groups in the system. This is discussed by W. J. Smith in "Modern Optical Engineering" McGraw-Hill, 1990. In any zoom system, at least two lens groups must be moved with respect to each other in order to have a variable focal length system and a fixed image plane position.

The complexity of a lens mechanical mount, or cam, is determined by the number of moving groups within the zoom lens. An example of a simple cam with two grooves is shown in W. J. Smith, FIG. 9.31, p. 276.

More moving optical groups may be required if other optical system characteristics are needed such as quality imaging over a range of object distances with large zoom power, or if the entrance and exit pupil locations need to be fixed. More elements within each group are often required to compensate for aberrations, as is the case with any traditional lens system.

Most of the modem miniature zoom lenses are composed of two groups of negative and positive powers. Such systems then have small size but a long back focal length, which is a serious drawback. For minimization purposes, these lens groups are further divided into subgroups that move independently to extend the zooming range and to attempt to minimize the overall size of the system. See, for example, U.S. Pat. No. 4,936,661 granted to E. I. Betensky, et al Jun. 26, 1990, U.S. Pat. No. 5,270,861 and U.S. Pat. No. 5,270,867 both granted to L. R. Estelle on Dec. 14, 1993. A two-element zoom system with negative and positive plastic elements is discussed in U.S. Pat. No. 5,473,473 granted to L. R. Estelle on Dec. 5, 1995. This is a 35 mm format lens with a speed of F/11 in the wide-angle position.

There is a continuing need for a small, compact, and inexpensive zoom lens system.

SUMMARY OF THE INVENTION

One feature herein is to provide a fast zoom lens imaging system with a reduced number of lens elements that provides high quality images over a large field of view, and at different zoom positions. Such a system enables simple and inexpensive fast wide-angle zoom lens with as few as two plastic elements. The cost of the zoom lens imaging system is directly reduced by minimizing the number of elements in the system and/or indirectly by reducing fabrication and assembly tolerances required to produce the system.

In one aspect, the number of elements in the zoom lens imaging system is reduced by coding the wavefront produced by the zoom lens system such that the imaging system is substantially invariant to aberrations related to misfocus. Such aberrations include, for example, chromatic aberration, spherical aberration, curvature of field, astigmatism, fabrication and assembly related misfocus, and temperature related misfocus. Image processing is used to decode the formed images and produce the final images.

In the prior art, such aberrations are not easily accommodated in a zoom lens with few lenses because of the large number of aberrations to be controlled and because of the changing parameters in the zoom imaging system. One feature of the zoom lens system herein shows how high quality images can be formed with a reduced number of lenses.

An extended depth of field zoom lens system according to one aspect includes a detector, a lens system between the object to be imaged and the detector comprising at least two lenses, and Wavefront Coding optics between the object and the detector. The Wavefront Coding optics are constructed and arranged to alter the optical transfer function of the zoom lens system in such a way that the altered optical transfer function is substantially less sensitive to focus related aberrations than was the unaltered optical transfer function. The Wavefront Coding optics affects the alteration to the optical transfer function substantially by affecting the phase of light transmitted by the optics. A post processing element processes the image captured by the detector, by reversing the alteration of the optical transfer function accomplished by the optics.

The Wavefront Coding optics may be integrally formed with at least one of the lenses. In one aspect, information regarding the location of the lenses in the lens system are provided to the post processing element. The processing applied by the post processing element is adjusted according to the lens information. More generally, information regarding the point spread function (PSF) of the lens system is provided to the post processing element and processing is modified according to the information.

In another aspect, the lens system comprises at least three lenses, and the lens system is constructed and arranged to have a constant working F/#. In this aspect, it is not necessary to provide the processing element with any information regarding PSF or lens position.

As a feature, the detector may be a charge coupled device (CCD). At least one of the lenses in the lens system may be made of optical plastic. The lens system may comprise two lenses in a positive/positive lens element configuration.

BRIEF DESCRIPTION OF THE DRAWINGS

FIGS. 1A and 1B show one zoom imaging system, with two lens elements; one or more of the lenses perform Wavefront Coding.

FIGS. 2A and 2B show one zoom imaging system, with three lens elements such that the working F/# is constant; one or more of the lenses perform Wavefront Coding.

FIGS. 7A–7D show MTFs for an imaging system with Wavefront Coding at wide angle and telephoto settings, before processing.

DETAILED DESCRIPTION OF THE PREFERRED EMBODIMENTS

Figure 3:
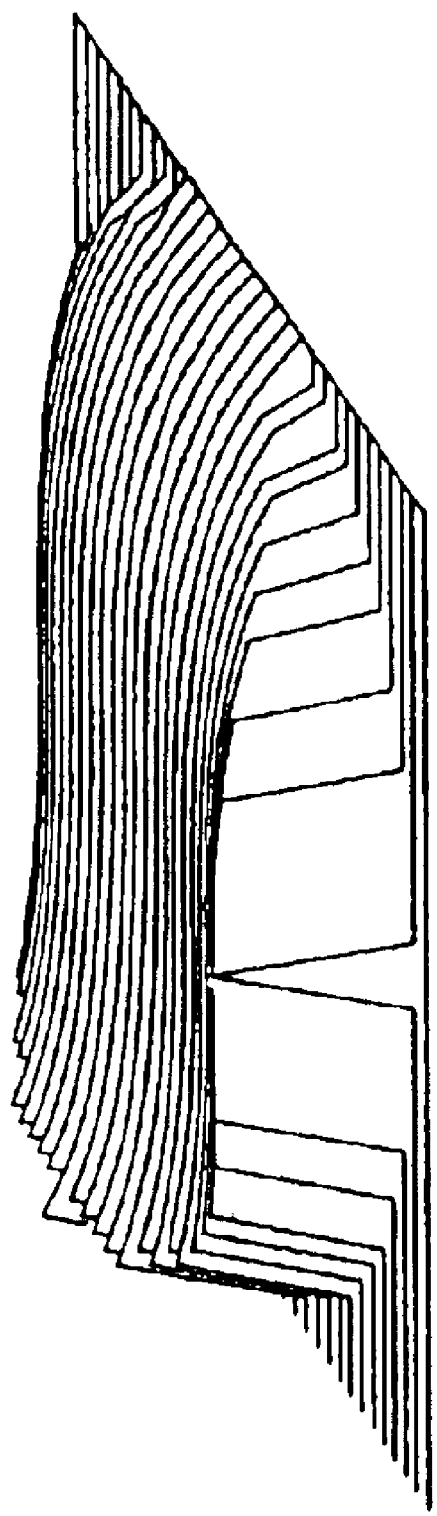
FIG. 3 shows a cubic phase function that produces an extended depth of field.

By coding the image forming wavefront and performing image processing on the resulting images zoom lenses can be designed that are very fast (small F/#) with a reduced number of optical elements. These zoom lenses can also have a very wide field of view and the equivalent of a flat image plane. By coding the wavefront and using image processing the zoom system can have an increased the depth of field and depth of focus well as reduced system sensitivity to misfocus aberrations. The extension of the depth of focus also means that the zoom lens can be made insensitive to temperature changes. In a similar fashion, manufacturing and assembly tolerances can be relaxed so that the accuracy with which the optics and detector array must be placed is reduced.

There are two primary forms of zoom lens systems that use Wavefront Coding. The first form, shown in FIG. 1A and FIG. 1B, uses as few as two lens elements 302, 304. By changing the distance between the two lens elements 302, 304 the value of the system focal length is varied, but the working F/# of the system also changes. With the working F/# varying, the PSFs and MTFs of the system can also vary. Image processing has access to lens position information so that the configuration of the optics is known to image processing. Image processing is optimized for groups of working F/#s, or equivalently for regions of system focal lengths, which are then automatically selected and used to process the resulting images as a function of zoom system configuration.

A second form of zoom system is shown in FIG. 2A and FIG. 2B, which uses a minimum of three lens elements, and which can maintain a constant working F/# with system focal length. When the working F/# is held constant, the PSFs and MTFs are also constant with zoom configuration. Since the PSFs and MTFs are not a function of the zoom system configuration, the digital processing (element 410) does not require information about the position of the optics.

More particularly, FIG. 1A shows a zoom imaging system 305 with two lens elements 302 and 304, at least one of which has a modified surface to code the wavefront. Lens position information 307A is used to select appropriate image processing 310 such that a final image 312 is formed.

FIG. 1B shows the same zoom imaging system 305 in a different zoom position, which has a different lens position information 307B sent to the image processing 310 to form the final image 312. One reason image processing block 310 uses lens position information 307 in a two lens system 305 is illustrated by the ray angles near the detector 308 in FIG. 1A compared to the ray angles near the detector of FIG. 1B. The rays enter the detector at different angles for the two lens configurations. When the ray angles are different for the two configurations the working F/#s, PSFs and MTFs for the two configurations 307A, 307B are also different. The processing applied by image processing block 310 accounts for these differences.

FIGS. 2A and 2B show a zoom imaging system 405 with three lens elements 402, 404, and 406 which are constructed and arranged such that the working F/# is constant as the system focal length is varied. One or more of the lens elements 402, 404, and 406 have modified optics to perform Wavefront Coding. Image processing block 410 of system 405 does not necessarily utilize lens position information associated with positions of lens elements 402, 404, 406 because image processing applied by block 410 does not depend on knowledge of the configuration of lens elements 402, 404, and 406 to obtain the final image. This is illustrated by the ray angles to the right of element 406 in FIG. 2A compared to the ray angles FIG. 2B. The rays enter the detector at the same angles independent of the system focal length. Thus the working F/#, PSFs, and MTFs are not a function of the focal length of the system and image processing 410 does not need knowledge of the configuration of the optics.

To make such zoom lenses, one or more of the optical elements 302 and 304 of FIG. 1A and FIG. 1B, and 402, 404, and 406 of FIG. 2A and FIG. 2B, are wavefront coded so that the resulting images 312, 412 are insensitive to focus related aberrations. In one aspect, a phase variation structure is applied to one or more of these optical elements. For example, the thickness of one or more of the lenses can be varied in such a manner as to apply the desired wavefront (phase) modifications. Other methods of modifying the wavefront include use of optical materials that have a spatially varying index of refraction and/or thickness, use of spatial light modulators, use of holograms, and/or use of micro mirror devices.

FIG. 3 shows one example of a wavefront coding suitable for application to lens 302, 304, 402, 404, or 406, illustrating thickness variations that encode the wavefront of light passing through the lens. Such lens modifications apply a wavefront phase function that produces an extended depth of field in the resulting images, after post processing by image processing 310, 410. In one example, the phase function is a cubic phase function mathematically described as:

$$\text{separable-cubic-phase}(x,y) = K[x^3 + y^3]$$

where K is a constant.

In another example, the phase fuction is a non-separable conventional Wavefront Coding phase function, which in normalized coordinates is:

$$\text{non-separable-cubic-phase}(p, \theta) = \sum_i a_i p^{b_i} \cos(w_i \theta + \phi_i)$$

$$0 \leq p \leq 1, \ 0 \leq \theta \leq 2pi.$$

Other alternative Wavefront Coding phase functions may be described as:

$$\text{cubic-related-forms}(x, y) = \sum_i a_i [\text{sign}(x)|x|^{b_i} + \text{sign}(y)|y|^{b_i}]$$

$$|x| \leq 1, |y| \leq 1$$

where sign(x)=+1 for x≥0, sign(x)=−1 otherwise.
For an odd integer b, these related forms trace out "cubic like" profiles of increasing slopes near the end of the aperture. For b with values between the odd integers, the related forms trace out other "cubic like" profiles that lie between the ones generated when b is an odd integer.

The above phase functions are for example useful in controlling misfocus and for minimizing optical power in high spatial frequencies. Minimizing the optical power at high spatial frequencies is often called antialiasing. When using a digital detector such as a CCD or CMOS device to capture an image, optical power that is beyond the spatial frequency limit of the detector masquerades or "aliases" as low spatial frequency power. For example, say that the normalized spatial frequency limit of a digital detector is 0.5. If the in-focus MTF from the conventional system with no Wavefront Coding produces a considerable amount of optical power beyond this spatial frequency limit, then aliasing artifacts can degrade the resulting images. By adding misfocus to the system without Wavefront Coding, the amount of high spatial frequency optical power can be decreased, reducing aliasing. With Wavefront Coding, as in FIGS. 1 and 2, the amount of optical power that can be aliased also decreases. In comparison to the prior art, the amount of aliasing in a wavefront coded system does not increase with a change of focus.

Figure 4B:
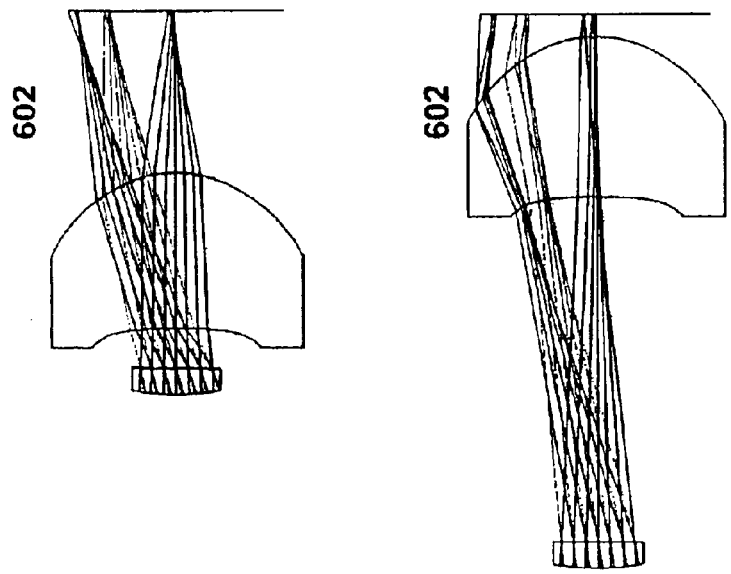
FIGS. 4A and 4B show ray traces for a two-element zoom lens.
Figure 4A:
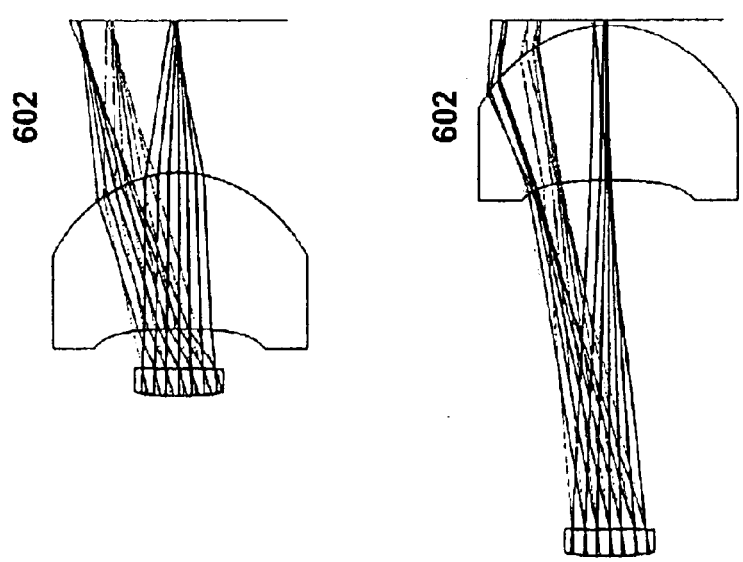
Figure 5A:
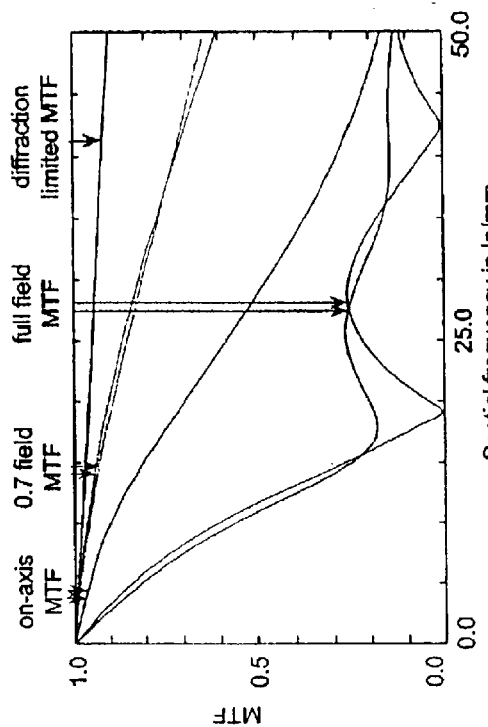
FIGS. 5A–5D show modulation transfer functions (MTFs) for an imaging system with no Wavefront Coding at wide angle and telephoto settings.
Figure 5C:
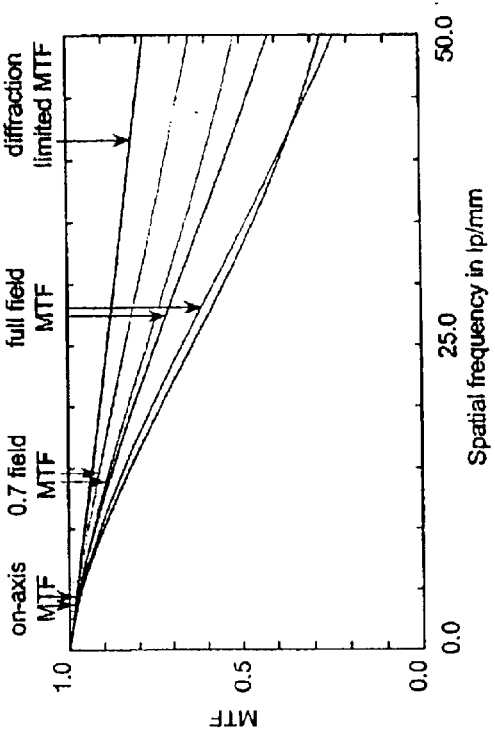
Figure 5B:
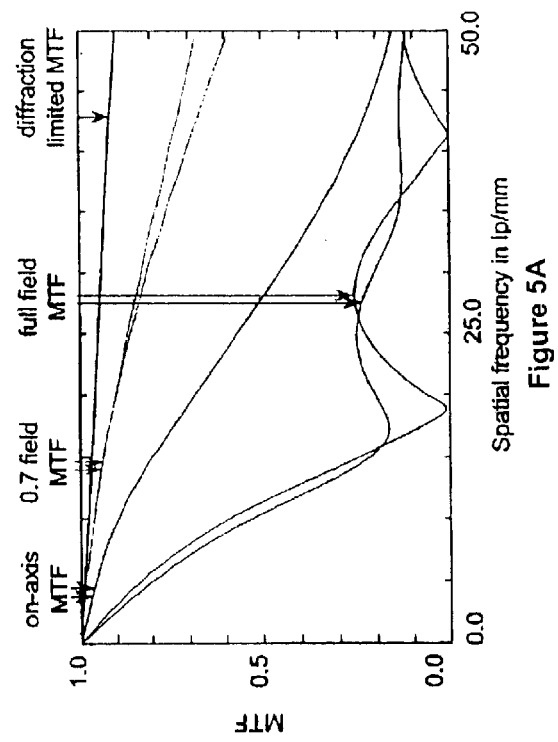
Figure 5D:
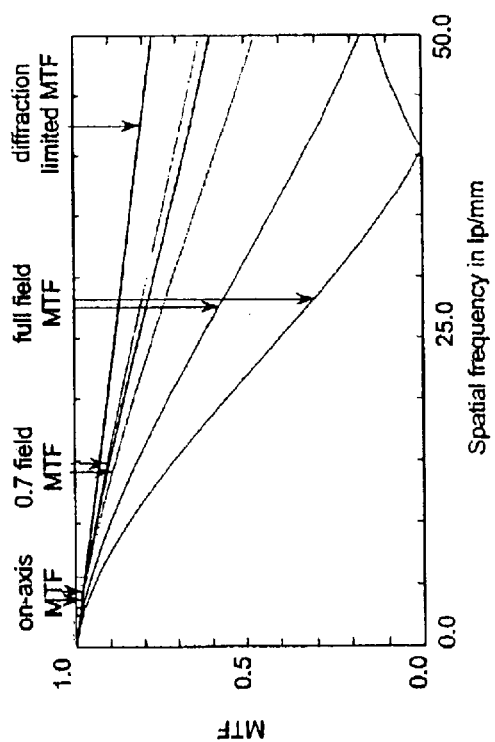
Figure 6C:
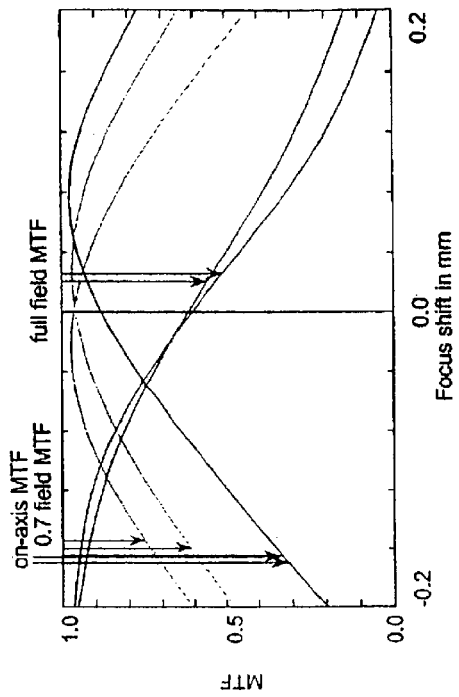
FIGS. 6A–6D show through-focus MTFs at 10 lp/mm for a two element zoom system without Wavefront Coding for wide angle and telephoto settings.
Figure 6D:
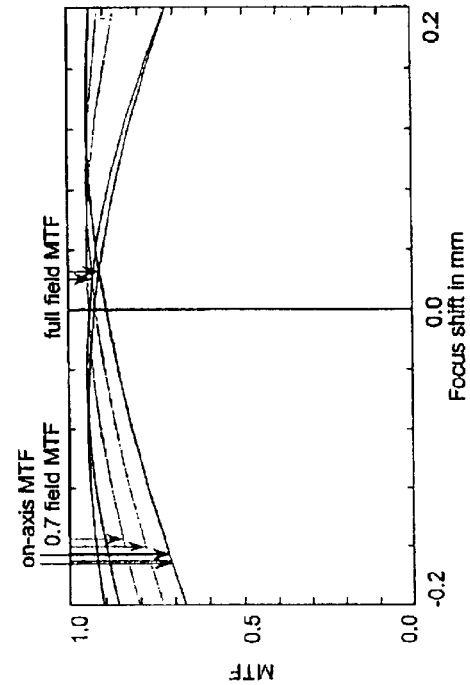
Figure 6A:
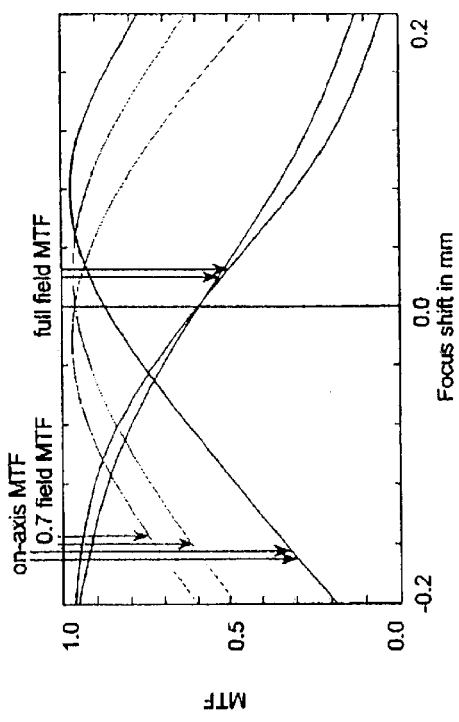
Figure 6B:
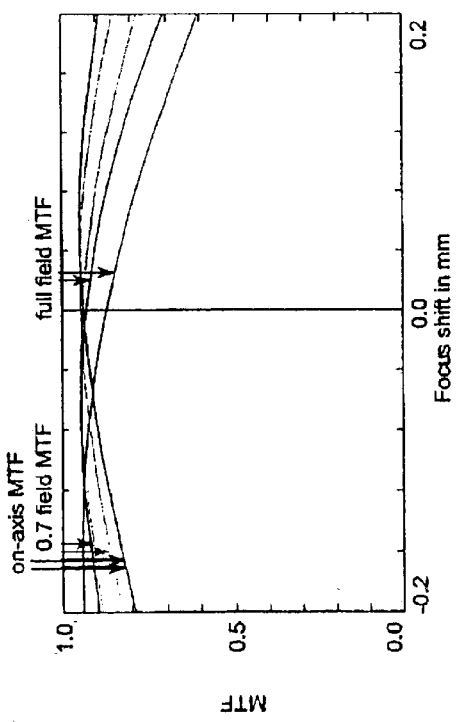
Figure 8A:
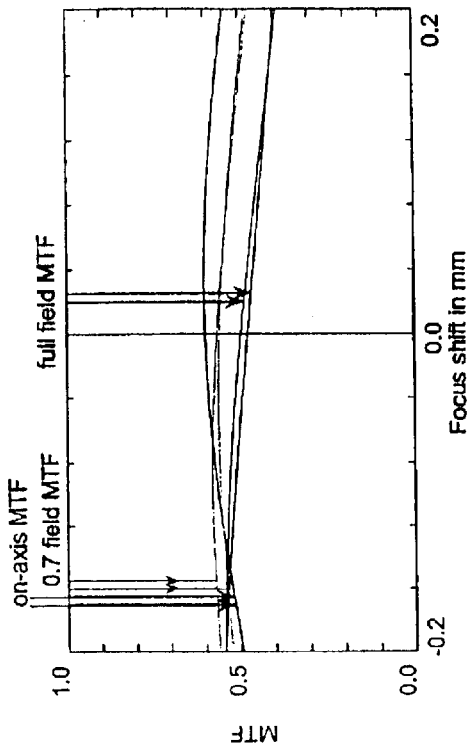
FIGS. 8A–8D show through-focus MTFs at 10 lp/mm for a two element zoom system with Wavefront Coding for wide angle and telephoto settings, before processing.
Figure 8B:
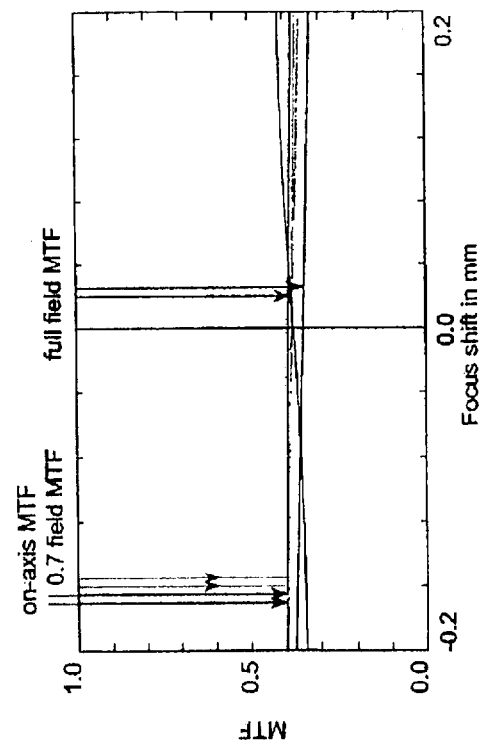
Figure 8C:
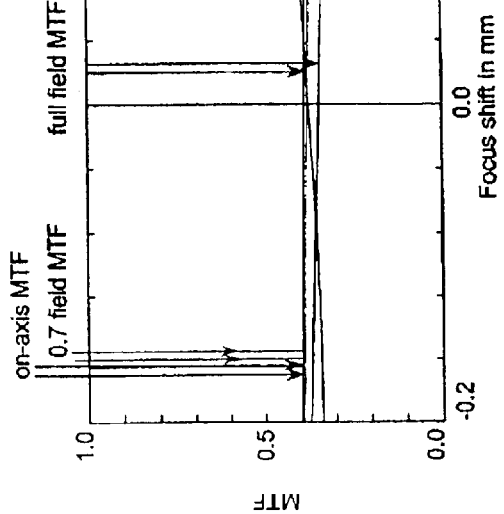
Figure 8D:
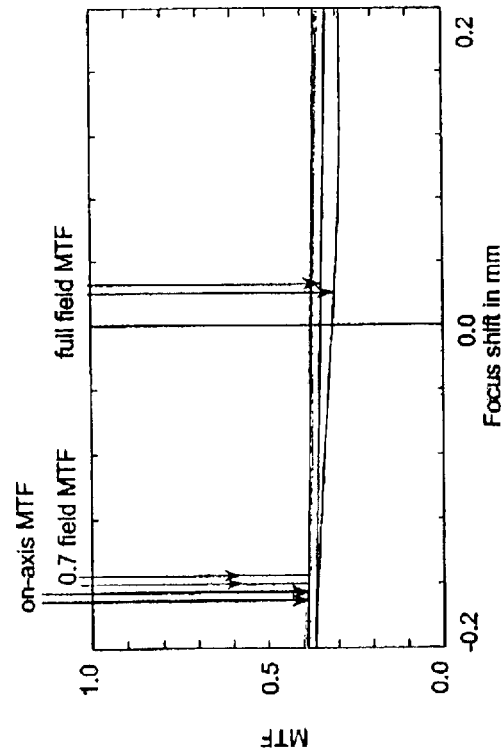

FIGS. 4A and 4B show ray traces for a two-element zoom lens 602 with Wavefront Coding in two configurations. Lens system 602 is in the zoom lens form used in FIG. 1. FIG. 4A shows ray traces for the wide angle configuration (top plot) and the telephoto configuration (bottom plot) for standard imaging of objects at infinity. FIG. 4B shows ray traces for the wide angle configuration (top plot) and the telephoto configuration (bottom plot) in a macro mode for objects at 200 mm.

A two element zoom lens system has a total of three combinations of lens elements that can be used. These combinations are:

1. Positive/positive
2. Positive/negative
3. Negative/positive

Traditional two element zoom systems nearly always employ either the positive/negative or negative/positive lens element configurations. This is because the use of positive and negative lens element combinations allows the lens designer to minimize the aberration of petzval curvature that otherwise would drastically limit the field of view of the traditional zoom system. Designs that employ the positive/positive lens element combination can have the shortest overall length, compared to designs that use negative lens elements, but also implicitly have the largest amount of petzval curvature. In traditional designs this petzval curvature is large enough to preclude the practical use of the positive/positive arrangement for traditional two element zoom systems.

In many zoom lens designs, minimum overall length and wide field of view are both desired. By using Wavefront Coding methods described above, the two element zoom lens design can use the positive/positive lens element combination in order to minimize the overall length of the zoom lens system while correcting the aberration of petzval curvature and other focus related aberrations by coding the wavefront and image processing the resulting images. Use of Wavefront Coding thus enables the design of a shorter zoom lens than is possible with traditional design methods. FIG. 4A and FIG. 4B show a positive/positive zoom system 602.

One embodiment of the positive/positive two-element zoom system 602 is specified below. This zoom system has been designed to image in a standard mode with objects at infinity, and in a macro mode with objects near 200 mm. The zoom system also works well with objects at intermediate positions. The full field of view of lens system 602 continuously varies from about 23° to 52°. This system is designed to be used with a digital detector with 5.6 micron square pixels and a Bayer color filter array. This detector also has lenslet array. In order to ensure maximum light collection by the lenslet array, the maximum chief ray angles for each of these configurations have been designed to be under 11°. Those skilled in the art of optical design will realize that this or similar lens systems can be used with a variety of other digital detector formats as well. All dimensions below are given in mm and indices of refraction and dispersions (V) are for the d line of the spectrum. Surface number 1 is the front of the first lens element. The mechanical layout of preferred embodiment is:

| SURFACE | RADIUS  | THICKNESS | INDEX | V    |
|---------|---------|-----------|-------|------|
| 1       | ASPHERE | 0.482     | 1.530 | 55.8 |
| 2       | ASPHERE | (A)       |       |      |
| 3       | ASPHERE | 2.855     | 1.530 | 55.8 |
| 4       | ASPHERE | (B)       |       |      |
| Image   |         |           |       |      |

Surface #2 is the stop. Surface #2 also contains the Wavefront Coding surface. The thickness of surfaces 2 and 4 vary with zoom configuration. The lens material is the optical plastic zeonex.

The rotationally symmetric aspheric surface height as a function of spatial position, or radius, is given:

$$Z = \frac{C \cdot r^2}{1 + \sqrt{1 - (K+1)C^2 \cdot r^2}} + D \cdot r^4 + E \cdot r^6 + F \cdot r^8 + G \cdot r^{10} + H \cdot r^{12}$$

Certain constants that define the rotationally symmetric surfaces are given as:

| Surface 1 | C = 0.233386  | D = −0.031277  | F = −0.128988   |
|-----------|---------------|----------------|-----------------|
|           | K = 3.656     | E = 0.080978   | G = 0.087080    |
|           |               |                | H = −0.010498   |
| Surface 2 | C = 0.002507  | D = 0.029598   | F = 0.103280    |
|           | K = 0.0       | E = −0.089061  | G = 0.0         |
|           |               |                | H = 0.0         |
| Surface 3 | C = −0.085283 | D = −0.012930  | F = 0.011175    |
|           | K = 53.030    | E = −0.014721  | G = 0.004873    |
|           |               |                | H = 5.699E−04   |
| Surface 4 | C = −0.459841 | D = 0.006828   | F = −2.809E−04  |
|           | K = −0.344    | E = −3.565E−04 | G = 7.026E−05   |
|           |               |                | H = −5.739E−06  |

Surface 2 contains the stop as well as the Wavefront Coding surface. The Wavefront Coding surface is used in addition to the rotationally symmetric surface 2 defined above. The Wavefront Coding surface form may be defined as:

$$S(x,y)=\beta_1[\text{sign}(x)|x|^{\alpha_1}+\text{sign}(y)|y|^{\alpha_1}]+\beta_2[\text{sign}(x)|x|^{\alpha_2}+\text{sign}(y)|y|^{\alpha_2}]$$

where $$x = \frac{x_{un-normalized}}{|x_{max}|}, \quad y = \frac{y_{un-normalized}}{|y_{max}|}$$

and where sign(x)=+1 for x≧0, and sign(x)=−1 otherwise, The parameters $\beta_1$, and $\beta_2$ control the contribution of each term and $\alpha_1$ and $\alpha_2$ control the maximum slope of each term. The values of $\alpha$ and $\beta$ are:

$\beta_1$=26.666, $\alpha_1$,=3.006
$\beta_2$=69.519, $\alpha_2$=9.613

The distance between the two lenses (A) of system 602 is a function of the focal length the zoom system. The distance from the second lens to the image detector (B), also known as the back focal length, is a function of the focal length and object position. In the standard imaging mode, with the object at infinity, the system distances, lengths, and working F/#s are:
Standard imaging, object at infinity

| Focal Length | Lens spacing (A) | Back focal length (B) | Overall Length | Working F/# |
|---|---|---|---|---|
| 3.864 | 0.725 | 2.794 | 6.857 | 2.8 |
| 6.136 | 4.226 | 1.549 | 9.113 | 4.3 |
| 9.454 | 6.315 | 0.100 | 9.753 | 6.2 |

When used in macro mode, the object position can be as close as 200 mm. Back focal length (B) varies with object distance. Lens spacing (A) is the same in standard and macro imaging. In the macro imaging mode, with the object at 200 mm, the system distances, lengths, and working F/#s are:
Macro imaging, object at 200 mm

| Focal Length | Lens spacing (A) | Back focal length (B) | Overall Length | Working F/# |
|---|---|---|---|---|
| 3.864 | 0.725 | 2.870 | 6.930 | 2.8 |
| 6.136 | 4.226 | 1.770 | 9.332 | 4.3 |
| 9.454 | 6.315 | 0.391 | 10.044 | 6.0 |

The performance of wavefront coded zoom lens system 602, as specified above, is described and compared to a zoom system not using Wavefront Coding in FIGS. 5 through 10. FIGS. 5 and 6 describe the MTF characteristics of the zoom system without Wavefront Coding. FIGS. 7 and 8 describe the MTF performance of the zoom system with Wavefront Coding but before image processing 410. FIG. 9 describes the MTF performance of the zoom system 602 after image processing 410. FIG. 10 describes the digital filters used in image processing 410.

The MTFs of the zoom system without Wavefront Coding are described in FIG. 5. The zoom system without Wavefront Coding is as described above but with the Wavefront Coding parameters $\beta_1=\beta_2=0$. FIGS. 5A and 5B describe the system in standard imaging mode with the object at infinity at the shortest focal length or widest imaging angle and at the longest focal length or narrowest imaging angle or telephoto respectively. FIGS. 5C and 5D are similar to FIGS. 5A and 5B with the system in macro imaging mode and the object being at 200 mm. FIG. 5C describes wide angle imaging while FIG. 5D describes telephoto imaging. The Wavefront Coding design method consists of minimizing, through traditional design methods, the non-focus related aberrations, such as coma, lateral color, and distortion. Focus related aberrations are controlled both through traditional design techniques and through Wavefront Coding via the optics and image processing.

With the positive/positive lens element configuration of zoom system 602, the largest monochromatic aberrations are related to field curvature. The effects of field curvature are clearly seen in the off-axis MTFs of the FIGS. 5A–5C. In these figures the full-field MTFs have lower responses than the on-axis MTFs. The full-field MTFs also have zeros caused by misfocus as a function of field angle (or field curvature) within the spatial frequency limit of the Bayer detector of 44 lp/mm. This two element zoom system without Wavefront Coding would image well only at small field angles or with a very small sized detector.

FIG. 6 describes the MTFs of the zoom system without Wavefront Coding at a spatial frequency of 10 lp/mm over a −0.2 mm to +0.2 mm deviation from the best focused image plane, or the through focus MTFs at 10 lp/mm. These curves again clearly show the limiting nature of field curvature on the zoom system without Wavefront Coding. FIGS. 6A–6D are arranged as in FIG. 5 with FIGS. 6A and 6B describing imaging with the object at infinity at wide angle and telephoto positions respectively. FIGS. 6C and 6D describe similar in a macro mode with the object at 200 mm. In FIGS. 6A and 6C the peak of the full field MTF is seen to be around −0.2 mm from best focus while the peak of the on-axis MTF is about +0.1 mm from best focus. Best focus has been adjusted to balance the effects field curvature so that the 0.7 field MTF is at best focus. FIGS. 6B and 6D show similar but less dramatic effects of field curvature due to the smaller field angles of the telephoto configurations. From FIG. 6 there is no one focus position with the system without Wavefront Coding where all field angles are well focused.

FIG. 7 shows the MTFs from the two element zoom system 602 with Wavefront Coding, but before image processing 410, according to the present invention. FIGS. 7A and 7B represent MTFs with the object at infinity at wide angle and telephoto configurations respectively. FIGS. 7C and 7D represent the MTFs with the object at 200 mm at wide angle and telephoto configurations respectively. From the MTFs of FIGS. 7A–7D notice that there is very little change in MTFs with field angle. All MTFs for each configuration are essentially identical, especially compared to the MTFs from the system without Wavefront Coding shown in FIG. 5. Notice also that the MTFs of FIG. 7 does not match the diffraction limited MTFs. The wavefront coded MTFs are lower than the diffraction limited MTFs but higher than the off-axis MTFs from the system without Wavefront Coding in FIG. 5. Image processing 410 is used to essentially transform the MTFs shown in FIG. 7 to any desired MTF. Typically image processing 410 is used to form MTFs that lay between the unprocessed wavefront coded MTFs and the diffraction limited MTFs.

FIGS. 8A–8D describes the through focus MTFs at 10 lp/mm of the zoom system 602 with Wavefront Coding, but without image processing 410. The arrangement of FIGS. 8A–8D is similar to that of FIGS. 7A–7D. Notice that the response of the through focus MTFs are much more independent of focus shift than the system without Wavefront Coding shown in FIG. 6. From FIG. 8A there is a large region, at least +/−0.2 mm, where the image plane can be positioned and still have essentially identical performance. By not having separated peaks of the through focus MTFs as a function of field angle, the Wavefront Coding MTFs are seen to not suffer from effects of field curvature. By also having a large region over which the image plane can be positioned and still image clearly, the wavefront coded system is seen to also have a large depth of focus. The depth of focus is seen to be the least for FIG. 8C as the response curves as a function of field angle vary the most for this configuration (wide angle, object at 200 mm).

Figure 9A:
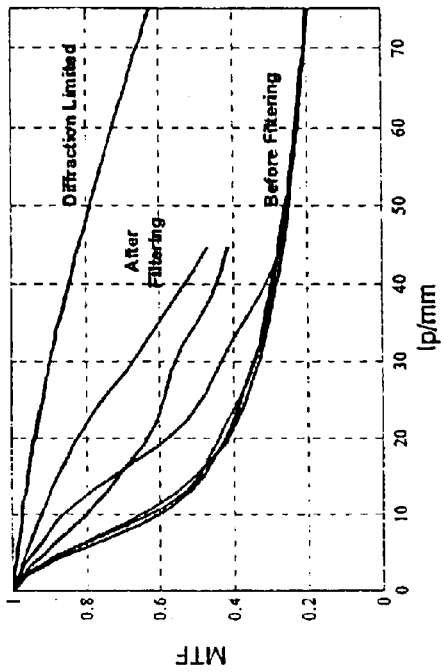
FIGS. 9A–9D show the wide angle and telephoto MTFs of FIGS. 6A–6D after signal processing.
Figure 9B:
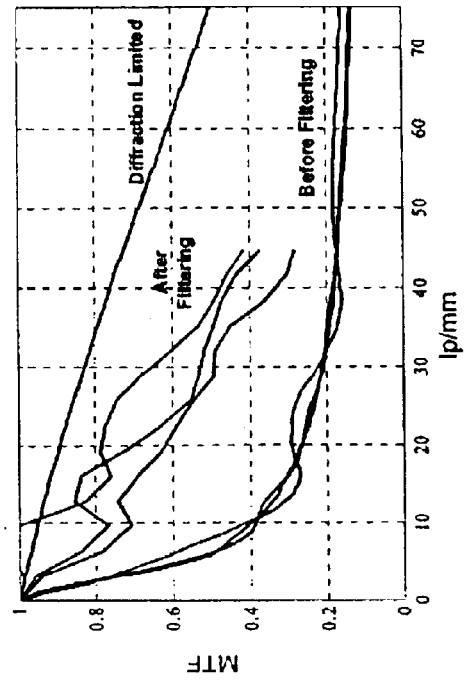
Figure 9C:
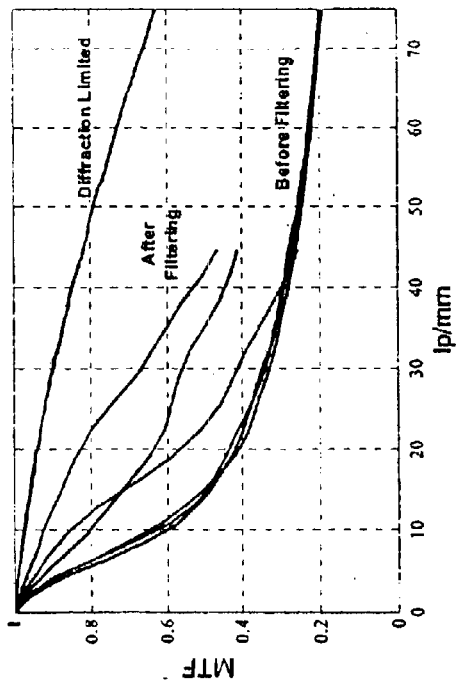
Figure 9D:
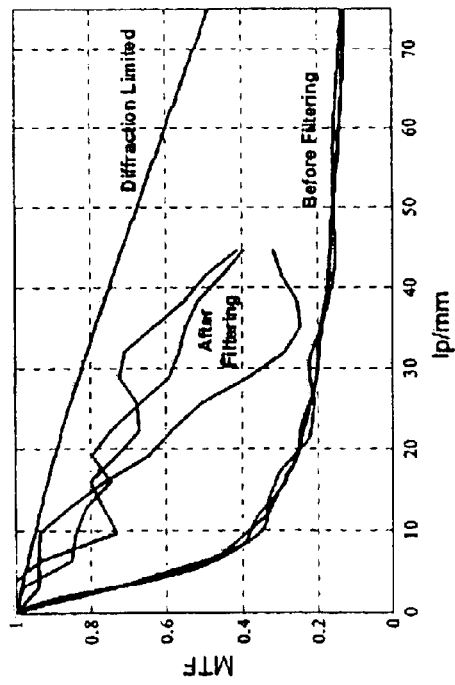

FIGS. 9A–9D describes the MTFs for zoom system 602 with Wavefront Coding and with image processing 410. FIGS. 9A and 9B describe the MTFs with the object at infinity imaging in wide angle and telephoto configurations respectively. FIGS. 9C and 9D describe the MTFs when the object is at 200 mm and in wide angle and telephoto configurations respectively. The MTFs of FIG. 9 include the MTFs due to the optics and the MTFs due to the 5.6 micron square pixel Bayer detector. The diffraction limited MTFs shown in FIG. 9 are those of FIG. 7 with the addition of the detector MTFs. Each figure shows the diffraction limited MTF, the MTFs before image processing 410, and the MTFs after image processing 410. The MTFs after image processing, or filtering, extend to the spatial frequency limit of the digital detector or 44 lp/mm. The MTFs after filtering for FIGS. 9A–9D lay between the MTFs before filtering and the diffraction limited MTFs. The corresponding PSFs after filtering, not shown, are spatially very compact. Only one digital filter is applied to each configuration of the zoom system. For example when imaging with a wide angle and object at infinity (FIG. 9A) a single digital filter is applied to all images. When the optics are changed to image in telephoto mode with the object at infinity (FIG. 9B) another digital filter is applied to all images resulting from this configuration.

Figure 10B:
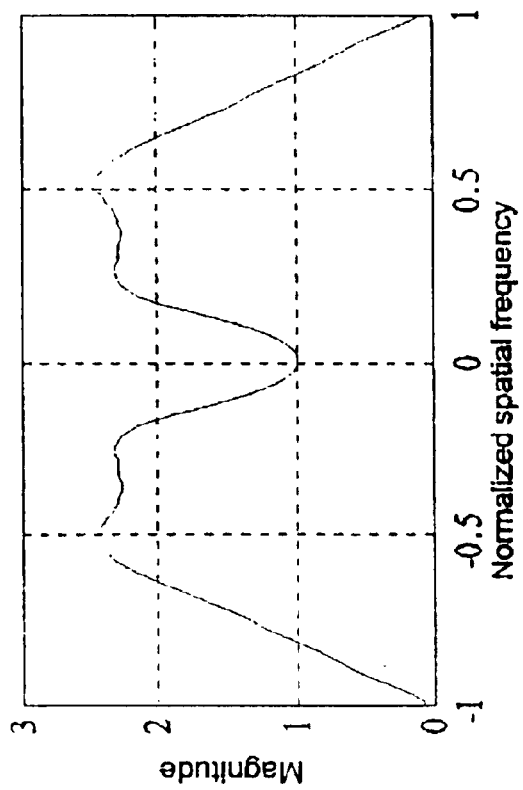
FIG. 10B shows the transfer function of the linear filter of FIG. 10A.
Figure 10A:
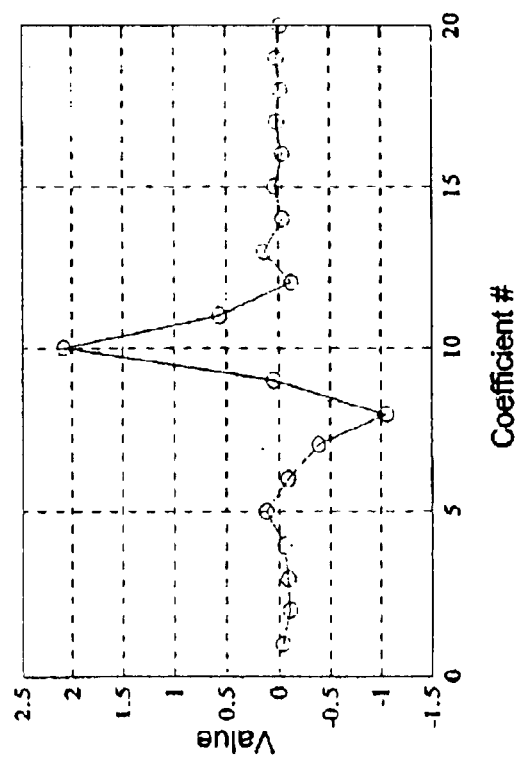
FIG. 10A shows a spatial domain linear filter according to the present invention for processing the intermediate image in order to produce the final image.

FIG. 10 describes one dimension of the two dimensional digital filter used to form the MTFs after filtering in FIG. 9. The two dimensional filter can be implemented as a rectangularly separable digital filter. FIG. 10A describes one dimension of a rectangularly separable filter. FIG. 10B shows the transfer function of the spatial domain filter of FIG. 10A.

For zoom system 602, image processing 410 uses the digital filter from FIG. 10A in order to form the final images 412. Computationally efficient rectangularly separable digital filtering may be used for implementations where the total number of multiplications and additions is minimized. General two dimensional linear filtering can also be used for processing flexibility. The operation of rectangularly separable filtering is to first filter each row (or column) independently with a one dimensional row (or column) filter. The filtered rows (or columns) form an intermediate image. Columns (or rows) of the intermediate image are then independently filtered with the column (or row) filter. This forms the final image.

The actual filter values as shown in FIGS. 10A and 10B are typically chosen to produce MTFs that match some desired MTF performance as well as produce PSFs that also match some desired spatial performance. MTF criteria after filtering typically include a minimum MTF values for groups of spatial frequencies. PSF criteria after filtering typically include a spatially compact shape with a maximum size for image artifacts. The actual digital filters can be calculated through least squares methods or through non-linear computer optimization.

What is claimed is:

1. An improved zoom lens system for imaging an object comprising:
   a detector;
   a lens system between the object and the detector comprising at least two lenses;
   wavefront coding optics between the object and the detector;
   said wavefront coding optics being constructed and arranged to alter an optical transfer function of the zoom lens system in such a way that the optical transfer function is substantially less sensitive to focus related aberrations than an unaltered optical transfer function,
   wherein the wavefront coding optics alters the optical transfer function substantially by affecting phase of light transmitted by the optics; and
   a post processing element for processing the image captured by the detector by reverse altering the optical transfer function accomplished by the optics.

2. The system of claim 1, wherein the wavefront coding optics are integrally formed with at least one of the lenses.

3. The system of claim 1, further comprising means for providing the post processing element with lens information regarding a location of the lenses in the lens system and means for modifying the post processing element according to the lens information.

4. The system of claim 1, further comprising means for providing the post processing element with lens position information, the post processing element processing the image according to the lens position information.

5. The system of claim 1 wherein the lens system comprises at least three lenses, and wherein the lens system is constructed and arranged to have a constant F/#.

6. The system of claim 1, wherein the detector is a digital detector comprising one of a CCD device and a CMOS device.

7. The system of claim 1 wherein at least one of the lenses in the lens system is made of optical plastic.

8. The system of claim 7 wherein all of the lenses in the lens system are made of optical plastic.

9. The system of claim 1 wherein the lens system comprises two lenses in a positive/positive lens element configuration.

10. The system of claim 1 wherein the wavefront coding optics implement a separable cubic phase function.

11. The system of claim 1 wherein the wavefront coding optics implement a non-separable cubic phase function.

12. The system of claim 1, wherein the wavefront coding optics implement a cubic related phase function of the form:

$$\text{cubic-related-forms}(x, y) = \sum_i a_i [\text{sign}(x) | x |^{b_i} + \text{sign}(y) | y |^{b_i}]$$

$$|x| \leq 1, |y| \leq 1$$

where sign(x)=+1 for x≥0, sign(x)=−1 otherwise.

13. The system of claim 1, wherein the wavefront coding optics implement a non-separable cubic-related phase function of the following form:

$$\text{non-separable-cubic-phase}(p, \theta) = \sum_i a_i p^{b_i} \cos(w_i \theta + \phi_i),$$

where $0 \leq p \leq 1, 0 \leq \theta \leq 2pi$.

14. A method for reducing focus related aberrations in images formed by a zoom lens system comprising the steps of:
   modifying a wavefront of transmitted light between the object to be imaged and a detector for capturing an image of the object;
   the step of modifying comprising the step of altering an optical transfer function of the zoom lens system in such a way that the optical transfer function is substantially less sensitive to focus related aberrations than an unaltered optical transfer function; and
   post processing the image captured by the detector by reverse altering the optical transfer function accomplished by the optics.

15. The method of claim 14, further comprising the steps of:
   providing a post processing element with lens information regarding a location of lenses in the zoom lens system; and
   modifying the post processing element according to the lens information.

16. The method of claim 14, further comprising the steps of:
   providing a post processing element with lens position information of the zoom lens system; and
   modifying the post processing element according to the lens position information.

17. The method of claim 14, wherein the step of modifying comprises the step of implementing a separable cubic phase function.

18. The method of claim 14, wherein the step of modifying comprises the step of implementing a non-separable cubic phase function.

19. The method of claim 14, wherein the step of modifying comprises the step of implementing a cubic related phase function of the form:

$$\text{cubic-related-forms}(x, y) = \sum_i a_i [\text{sign}(x) |x|^{b_i} + \text{sign}(y) |y|^{b_i}]$$

$|x| \leq 1, |y| \leq 1$ where sign(x)=+1 for x≥0, sign(x)=−1 otherwise.

20. The method of claim 14, wherein the step of modifying comprises the step of implementing a cubic related phase function of the form:

$$\text{non-separable-cubic-phase}(p, \theta) = \sum_i a_i p^{b_i} \cos(w_i \theta + \phi_i),$$

where $0 \leq p \leq 1, 0 \leq \leq \theta \leq 2pi$.

21. In a zoom lens system for imaging an object to an image with variable focal length, the improvement comprising:
   a wavefront coding optical element for modifying a phase function of an optical transfer function to increase a depth of focus of the image;
   a post processing element for processing the image to modify phase function effects induced by the wavefront coding element in the image so as to generate a final image of the object.

22. In the zoom lens system of claim 21, the zoom lens system of the type wherein at least two optical elements are positioned relative to one another to change the variable focal length, the post processing element utilizing position information of the two optical elements in its processing to the final image.

23. In the zoom lens system of claim 21, the wavefront coding element being one or a combination of (a) one or more separate optical elements within the zoom lens system, (b) one or more optical modifications to one or more optical element surfaces of the zoom lens system.

24. In the zoom lens system of claim 23, one or both of the separate optical elements and modifications comprising one or both of holograms and mirrors.

25. In the zoom lens system of claim 21, the wavefront coding element comprising optical material with one or both of varying optical thickness and varying index of refraction.

26. In the zoom lens system of claim 21, further comprising a detector at the image, the post processing element connected with the detector to process electronic images of the detector.

27. A zoom lens imaging system, comprising:
   a detector;
   a plurality of lens elements for imaging an object onto the detector, at least one of the lens elements being moveable to modify a focal length of the zoom lens imaging system;
   wavefront coding optics for modifying phase of an optical wavefront between the object and the detector;
   a post processor connected with the detector for post processing images from the detector to generate a final image by reversing phase effects induced by the wavefront coding optics.

28. The zoom lens imaging system of claim 27, wherein the wavefront coding optics is formed with one or more of the plurality of lens elements.

29. The zoom lens imaging system of claim 27, the post processor obtaining position information of the at least one lens element and utilizing the position information in post processing the images.

* * * * *